US011884058B2

(12) United States Patent
Kelekar et al.

(10) Patent No.: US 11,884,058 B2
(45) Date of Patent: Jan. 30, 2024

(54) IMAGE FORMATION DEVICE WITH RADIATION FIXATION

(71) Applicant: Hewlett-Packard Development Company, L.P., Spring, TX (US)

(72) Inventors: Rajesh Kelekar, Palo Alto, CA (US); Napoleon J. Leoni, Palo Alto, CA (US); Omer Gila, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/761,370

(22) PCT Filed: Oct. 29, 2019

(86) PCT No.: PCT/US2019/058522
§ 371 (c)(1),
(2) Date: Mar. 17, 2022

(87) PCT Pub. No.: WO2021/086326
PCT Pub. Date: May 6, 2021

(65) Prior Publication Data

US 2022/0371339 A1 Nov. 24, 2022

(51) Int. Cl.
*B41J 11/00* (2006.01)

(52) U.S. Cl.
CPC .... *B41J 11/00214* (2021.01); *B41J 11/00216* (2021.01)

(58) Field of Classification Search
CPC . B41J 2/01; B41J 2/41; B41J 11/00214; B41J 11/0015; B41J 11/00216; B41J 11/00218; B41J 11/002; B41J 11/00212; B41J 2/06; B41J 2/3855; B41M 7/0081; B41M 7/009; B41M 5/0047; C09D 11/322; G03G 15/0194
See application file for complete search history.

(56) References Cited

U.S. PATENT DOCUMENTS

| | | | | |
|---|---|---|---|---|
| 8,272,729 | B2 * | 9/2012 | Caiger | B41J 11/0024 347/101 |
| 8,628,190 | B2 * | 1/2014 | Gila | B41J 2/0057 347/102 |
| 9,073,362 | B2 | 7/2015 | Kremers et al. | |
| 9,333,791 | B2 | 5/2016 | Kaneuchi et al. | |
| 9,676,209 | B2 | 6/2017 | Veis | |
| 2003/0081096 | A1 | 5/2003 | Young | |

(Continued)

FOREIGN PATENT DOCUMENTS

| | | | |
|---|---|---|---|
| CN | 105988323 | A | 10/2016 |
| DE | 69307562 | T2 | 5/1997 |
| WO | WO-2011032939 | A1 | 3/2011 |

*Primary Examiner* — John Zimmermann
(74) *Attorney, Agent, or Firm* — Michael Dryja

(57) ABSTRACT

An image formation device includes at least one frame portion supporting at least one emitter to emit airborne charges, at least one radiation element to emit radiation, and a fluid ejection device to deposit droplets of ink particles within a non-aqueous fluid carrier onto a substrate. Upon relative movement between the at least one frame portion and the substrate, the emitted airborne charges are to electrostatically fix, and the at least one radiation element is to emit radiation to cause at least further fixation of, the deposited particles relative to the substrate.

15 Claims, 9 Drawing Sheets

(56) References Cited

U.S. PATENT DOCUMENTS

| | | | | |
|---|---|---|---|---|
| 2009/0207223 | A1* | 8/2009 | Cofler | B41J 11/00218 118/620 |
| 2011/0298876 | A1* | 12/2011 | Takeuchi | B41M 5/0017 347/102 |
| 2013/0077998 | A1 | 3/2013 | Tombs et al. | |
| 2015/0138288 | A1* | 5/2015 | Chen | B41J 2/515 347/102 |
| 2016/0257135 | A1* | 9/2016 | Grigore | B41M 5/007 |
| 2017/0334200 | A1* | 11/2017 | Murayama | B41J 11/42 |
| 2018/0370141 | A1* | 12/2018 | Eller | B29C 64/291 |
| 2019/0062579 | A1 | 2/2019 | Loccufier | |
| 2019/0315132 | A1* | 10/2019 | Doo | B41J 25/001 |
| 2020/0039251 | A1* | 2/2020 | Fromm | B41J 11/00214 |
| 2020/0215829 | A1* | 7/2020 | Ohnishi | C09D 11/326 |

* cited by examiner

IMAGE FORMATION DEVICE WITH RADIATION FIXATION

BACKGROUND

Modern printing techniques involve a wide variety of media, whether rigid or flexible, and for a wide range of purposes. In some instances, a fluid ejection device may be used to deposit droplets of ink onto the media.

DETAILED DESCRIPTION

Figure 1:
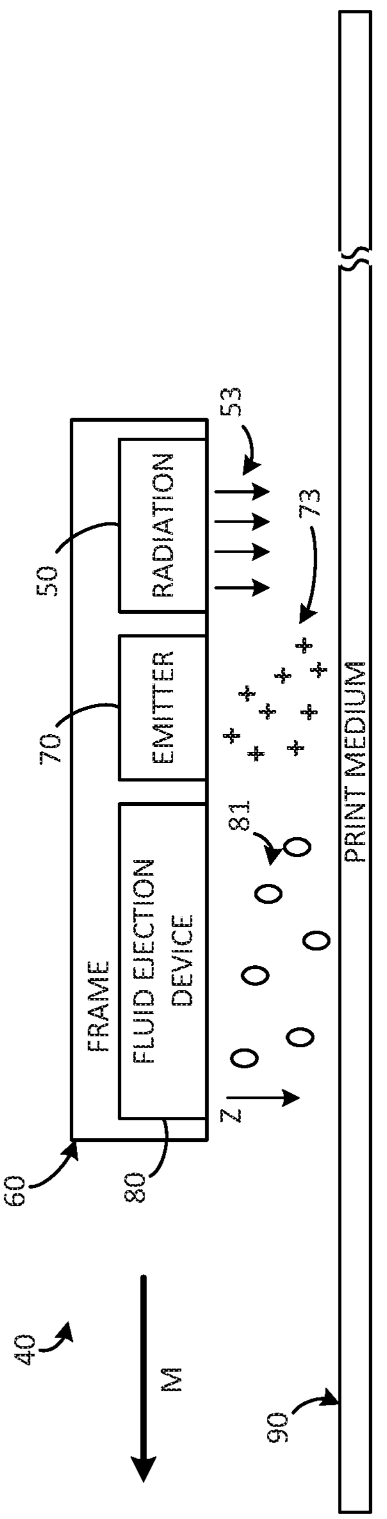
FIG. 1 is a diagram including a side view schematically representing an example image formation device and/or example method of image formation.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

In at least some examples, an image formation device comprises at least one frame portion supporting a fluid ejection device, at least one emitter to emit airborne charges, and at least one radiation element to emit radiation. The fluid ejection device is to deposit droplets of ink particles and resin within a non-aqueous fluid carrier onto a substrate to at least partially form an image on the substrate. Upon relative movement between the at least one frame portion and the substrate, the emitted airborne charges are to electrostatically fix, and the emitted radiation is to cause further fixation of, the deposited ink particles relative to the substrate. In some such examples, the further fixation of the deposited ink particles (by action of at least partial polymerization of the resin via radiation) may sometimes be referred to as a chemical fixation, i.e. chemical pinning of the deposited ink particles relative to the substrate.

In some such examples, the emitted radiation may cause at least partial polymerization of the resin within the deposited droplets on the substrate, which may increase a viscosity of the deposited droplets. This increased viscosity, in turn, may inhibit spreading of the droplets laterally on the substrate, which may result in the ink particles becoming further fixed and remaining at their intended locations on the substrate to at least partially form the image on the substrate. Among other aspects, this further fixation of the deposited ink particles via such radiation may enhance image quality, clarity, etc.

In some examples, later aspects of the example image formation may comprise performing further emission of radiation to further polymerize and/or cure the resin to complete the image formation on the substrate. In some such examples, prior to this further emission of radiation, the example image formation device may evaporate or otherwise non-mechanically remove the liquid (e.g. the liquid carrier) from the substrate.

In some examples, the image formation is performed independent of (e.g. without) a mechanical-type removal of the liquid carrier from the substrate after the electrostatic fixation of the deposited ink particles. In some such examples, the mechanical-type liquid removal elements may comprise a squeegee element, roller(s), and/or scraping blade, etc. In some such examples, this arrangement may facilitate scanning-type image formation via a scanning carriage which moves in a back-and-forth motion across a width of a substrate at least because the omission of the mechanical-type liquid removal may significantly simplify a structure, organization, operation, etc. of the scanning carriage and/or other portions of the example image formation device.

In some such examples of omitting the mechanical-type liquid removal, the application of radiation to further fix the ink particles relative to the substrate may achieve limiting the lateral spread of ink particles that might otherwise be achieved via application of a mechanical-type liquid removal just after the electrostatic fixation of the ink particles relative to the substrate.

These examples, and additional examples, are described in more detail below in association with at least FIGS. 1-12.

As shown in FIG. 1, in some examples an example image formation device 40 comprises a frame portion 60 which supports a fluid ejection device 80, an emitter 70, and a radiation element 50. The fluid ejection device 80 is to deposit droplets 81 of ink particles within a non-aqueous fluid carrier onto a substrate 90, such as during relative movement between the frame portion 60 and the substrate 90. As further shown in FIG. 1, during such relative movement, emitter 70 emits airborne charges 73 which act to electrostatically fix the ink particles of the deposited droplets 81 relative to the substrate 90. As further shown in FIG. 1, during such relative movement, the radiation element 50 is to emit radiation to cause further fixation the deposited particles relative to the substrate, which is described in more detail below. The image formation device may sometimes be referred to as a printer, press, or the like. Further details regarding these aspects of image formation are described later in association in with at least FIGS. 2A-2D.

In some examples, the frame portion 60 may comprise a scanning carriage for use in scanning-type image formation, as described later in further detail in association with at least FIGS. 6A-7. In some such examples, the frame portion 60 supports the fluid ejection device 80, emitter 70, and radiation element 50 to move all of these respective image formation elements (80, 70, 50) together relative to the substrate, such as a print medium.

However, in some examples, the frame portion 60 may comprise structures or arrangements other than a scanning carriage to support the respective image formation elements (e.g. 80, 70, 50) for operation relative to a substrate 90 that moves relative to the respective image formation elements (e.g. 80, 70, 50) to form an image on the substrate. At least some such examples are further described later in association with at least FIGS. 8-10.

In some examples, the frame portion 60 may comprise a single frame portion or may comprise multiple frame portions.

In some examples, the fluid ejection device 80 is to deposit the droplets with the resin dissolved within the liquid carrier and with the deposited droplets having an electrical conductivity less than 200 picoSiemens/cm. In some examples, the fluid ejection device 80 is to deposit the droplets with the resin dispersed within the liquid carrier to cause the resin to encapsulate each respective ink particle, wherein the charge source is to emit the charges to electrostatically fix at least the resin-encapsulated ink particles relative to the substrate.

In some examples, a ground element (GND) may be connectable to the substrate 90 in FIG. 1, engageable against substrate 90 (e.g. via rolling, sliding, etc.), and/or form part of substrate 90, as later described and/or illustrated in the various examples throughout the present disclosure in association with at least FIGS. 2A-10A.

FIGS. 2A-2D are a series of diagrams schematically representing at least some more detailed aspects of image formation device (and/or method) associated with the image formation device and/or method described in association with at least FIG. 1 and various examples throughout the present disclosure. In particular, each of the FIGS. 2A-2D represents a different snapshot in time during a method of image formation on substrate 90. Accordingly, for illustrative purposes, each of FIGS. 2A-2D depict a particular portion 90A of substrate 90 to which various aspects of image formation are performed.

Figure 2A:
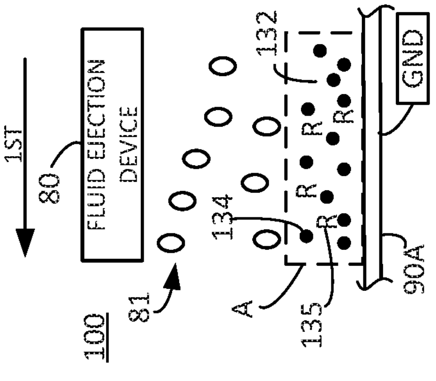
FIGS. 2A-2D are a series of diagrams schematically representing different aspects of example image formation.

As shown in FIG. 2A, in some examples one aspect of image formation comprises fluid ejection device 80 depositing droplets 81 of ink particles 134 and resin 135 within a non-aqueous liquid carrier 132 on the substrate 90, as relative movement occurs between the frame portion 60 and the substrate 90 (represented via directional arrow "$1^{st}$"). As depicted within the dashed lines A in FIG. 2A, deposited droplets 81 result in ink particles 134 and resin 135 being suspended within liquid carrier 132 on substrate 90, with ink particles 134 having a location and/or spacing which begins to form at least a portion of an image on portion 90A of substrate 90. In some examples, the droplets 81 may comprise ink particles 134 (e.g. pigments), the resin 135, dispersants, and the liquid carrier 132.

In some examples, the fluid ejection device 80 comprises a drop-on-demand fluid ejection device. In some examples, the drop-on-demand fluid ejection device comprises an inkjet printhead. In some examples, the inkjet printhead comprises a piezoelectric inkjet printhead. In some examples, the fluid ejection device 80 may comprise other types of inkjet printheads. In some examples, the inkjet may comprise a thermal inkjet printhead. In some examples, the droplets 81 may sometimes be referred to as being jetted onto the media. With this in mind, example image formation according to at least some examples of the present disclosure may sometimes be referred to as "jet-on-media", "jet-on-substrate", "offjet printing", and the like.

In some examples, fluid ejection device 80 (e.g. FIGS. 1, 2A) may comprise a permanent component of image formation device 100, which is sold, shipped, and/or supplied, etc. as part of image formation device 100. It will be understood that such "permanent" components may be removed for repair, upgrade, etc. as appropriate. However, in some examples, fluid ejection device 80 may be removably received, such as in instances when fluid ejection device 80 may comprise a consumable, be separately sold, etc.

In some examples, substrate 90 comprises a metallized layer or foil to which a ground element GND is electrically connected. In some examples, an electrically conductive element separate from the substrate 90 is provided to contact the substrate 90 in order to implement grounding of the substrate 90. Further details re the grounding of substrate are provided below.

Figure 2B:
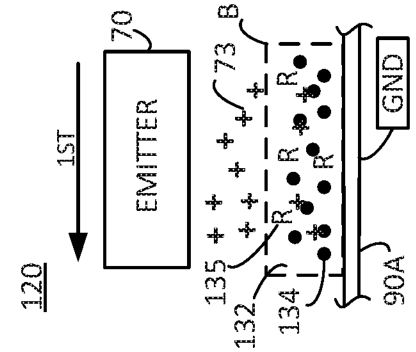
Figure 2C:
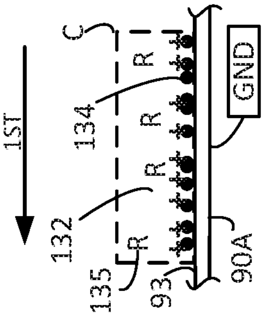

With further reference to FIGS. 2A-2D, through further relative movement of frame portion 60 (e.g. in the first direction) and portion 90A of substrate 90, additional aspects of image formation are performed on or relative to portion 90A following the operation of fluid ejection device 80 depicted in FIG. 1. Accordingly, FIG. 2B depicts the operation of emitter 70 on portion 90A of substrate 90 in which emitter 70 emits airborne charges 73 to charge the ink particles 134, as represented via the depiction in dashed lines B in FIG. 2B. Once charged, the ink particles 134 move, via electrostatic attraction relative to the grounded substrate 90, through the liquid carrier 132 toward the substrate 90 to become electrostatically fixed on the substrate 90 (represented via the depiction in dashed lines C in FIG. 2C), as relative movement between the frame portion 60 and the substrate 90 continues. While FIG. 2C depicts all (or substantially all) the charges 37 as positive charges, it will be understood that in some examples all (or substantially all) the charges can be negative charges, as further detailed below.

As will be further appreciated from FIG. 2C, with the ink particles 134 electrostatically pinned against the substrate 90, the liquid carrier 132 exhibits a supernatant relationship relative to the ink particles 134. Moreover, the ink particles 134 remain electrostatically pinned relative to substrate 90 because of the strength of the electrostatic forces (EF), which can be on the order of millions times greater than the force of gravity in at least some examples. As previously noted, the location at which the ink particles 34 become pinned corresponds to their targeted location as part of a pattern of deposited ink particles 34 to form an image on substrate 24. Accordingly, the ink particles 34 will remain in their electrostatically fixed (e.g. pinned) location as long as the electrostatic forces remain sufficiently strong.

Figure 2D:
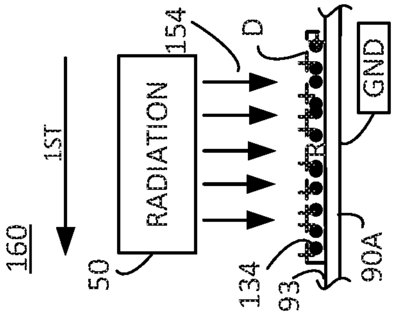

With continued relative movement between the frame portion 60 and the substrate 90, a further aspect of the example image formation comprises operation of a radiation element 50, as depicted in FIG. 2D. In particular, as shown in FIG. 2D, radiation element 50 emits radiation toward at least the liquid carrier 132, ink particles 134, resin 135 and substrate 90 (shown in FIG. 2C) to cause further fixation of the ink particles 134 relative to the substrate 90.

In some such examples, the emitted radiation 154 may cause at least partial polymerization of the resin (R) 135 on the substrate 90, which may increase a viscosity of the deposited droplets 81. This increased viscosity, in turn, may inhibit spreading of the droplets 81 laterally on the substrate 90, which may result in the ink particles 134 becoming further fixed and remaining at their intended locations on the substrate to at least partially form the image on the substrate 90.

As further described later in association with at least FIGS. 4A-4B, 5A-5B, the particular effect of the radiation on the resin (R) 135 may depend on whether the resin (R) 135 is dissolved or is dispersed in the liquid carrier 132 of the droplets 81. In either case, the radiation emitted by the radiation element 50 acts to further fix the ink particles 134 relative to the substrate 90.

In some examples, the term "resin" may comprise a formulation including monomers, oligomers, pre-polymers, photoinitiators, thermal initiators, and/or other additives. In some examples, the resin is polymerizable by radiation, polymerizable by heat, or polymerizable by both radiation and heat, depending on the example. In some examples, the heat may be in the form of convection and/or conduction.

In some examples, the radiation element 50 may emit the radiation in a wavelength which at least partially overlaps with an absorption spectrum (e.g. wavelengths) of the components of the deposited droplets 81, such as but not limited to an absorption spectrum of the ink particles 134 (e.g. pigments). In some such examples, the heating of the ink particles (caused by the emitted radiation) also may result in heating of the deposited droplets 81 on the substrate, which in turn may accelerate evaporation of the liquid carrier 132. This accelerated evaporation also may cause an increase in a viscosity of the deposited droplets 81 (particularly including the liquid carrier 132) on the substrate 90, which in turn may inhibit lateral spreading of the droplets 81 and of the ink particles 134 such that the ink particles 134 tend to remain in their intended location and pattern for forming an image on the substrate 90. In some examples, this heating of the droplets 81 also may act to at least partially polymerize the resin R 135 in examples in which the resin R 135 is thermally polymerizable, which may also cause an increase in viscosity and a resulting reduction in lateral spreading of the droplets 81 and ink particles 134. In at least this context, it will be understood that in some examples the resin R 135 may be polymerizable by both radiation (e.g. UV, infrared) and by heat.

Figure 3A:
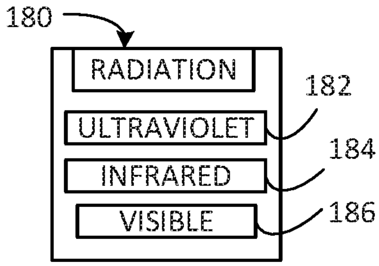
FIG. 3A is a block diagram schematically representing an example radiation element.

In some examples, the radiation element 50 in FIGS. 1 and 2D may comprise an example implementation as a radiation element 180 shown in FIG. 3A, which may comprise an ultraviolet (UV) radiation element 182 to emit ultraviolet radiation, an infrared radiation element 184 to emit infrared radiation, and/or a visible radiation element 186 to emit visible radiation. It will be understood that the selected wavelength and/or type of radiation element may at least depend on an absorption spectrum (e.g. wavelengths) of the resin at which polymerization occurs.

In some examples, the radiation-induced polymerization of the resin (in the deposited droplets) may occur via a free radical route. In some such examples, this free radical route-based polymerization may apply to acrylate systems, methylacrylate systems, polyester/styrene systems, and/or may apply to thiol-ene systems.

In some examples, the radiation-induced polymerization of the resin (in the deposited droplets) may occur via a cationic route. In some such examples, this cationic-route-based polymerization may apply to pre-polymers including those with epoxide functionalities, oxetane functionalities, vinyl ether functionalities, and/or hydroxyl functionalities.

With further reference to at least FIGS. 1 and 2A-2D, in some examples, as part of ejecting droplets (e.g. 81 in FIG. 2A), the fluid ejection device 80 is to deposit the non-aqueous liquid carrier 132 on the substrate 90. In some examples, the liquid carrier 132 may be a dielectric fluid. In some examples, the non-aqueous liquid comprises an oil-based fluid, such as but not limited to an isoparrafinic fluid, which may be sold under the trade name ISOPAR®. In some such examples, the non-aqueous liquid may comprise other oil-based liquids suitable for use as a dielectric liquid carrier. In some examples, the non-aqueous liquid carrier 132 can potentially incorporate a much wider range of pigment and resin loadings than an aqueous liquid carrier, thereby enhancing a desired opacity, color vibrancy, etc. in the formed image on the substrate.

With further reference to FIG. 2B, in some examples the emitter 70 may comprise a corona, plasma element, or other charge generating element to generate a flow of charges. Accordingly, the emitter 70 may sometimes be referred to as a charge source, charge generation device, and the like. The generated charges may be negative or positive as desired. In some examples, the emitter 70 comprises an ion head to produce a flow of ions as the charges. It will be understood that the term "charges" and the term "ions" may be used interchangeably to the extent that the respective "charges" or "ions" embody a negative charge or positive charge.

In the particular instance shown in FIG. 2B, the charges 73 emitted by emitter 70 can become attached to the ink particles 134 to cause all of the charged ink particles to have a particular polarity, which will be attracted to ground. In some such examples, all or substantially all of the charged ink particles 134 will have a negative charge or alternatively all or substantially all of the charged ink particles 134 will have a positive charge.

Via such example arrangements such as depicted in FIGS. 2A-2D, the charged ink particles 134 become electrostatically fixed (e.g. pinned) on the substrate 90 in a location on the substrate 90 generally corresponding to the location (in an x-y orientation) at which they were initially received onto the medium 130 as jetted via fluid ejection device 80 of the image formation device 100. Via such electrostatic fixation, the ink particles 134 will retain their position on substrate 90 even when other ink particles (e.g. different colors) are added later, excess liquid is removed, etc. It will be understood that while the ink particles may retain their position on substrate 90, some amount of expansion of a dot (formed of ink particles) may occur after the ink particles 134 (within liquid carrier 132) are jetted onto substrate 90 and before they are electrostatically pinned (i.e. electrostatically fixed).

In some examples, the ground element GND may comprise an electrically conductive element in contact with a portion of the substrate 90. In some examples, the electrically conductive element may comprise a roller or plate in rolling or slidable contact, respectively, with a portion of the media. In some examples, the ground element GND is in contact with an edge or end of the media. In some examples, the electrically conductive element may take other forms, such as a brush or other structures. Accordingly, it will be understood that the ground element GND is not limited to the particular location shown in FIGS. 2A-2D.

In some examples, the substrate 90 comprises a non-absorbing material, non-absorbing coating, and/or non-absorbing properties. Accordingly, in some examples the substrate 90 is made of a material which hinders or prevents absorption of liquids, such as a liquid carrier and/or other liquids in the droplets received on the substrate. In one aspect, in some such examples the non-absorbing substrate does not permit the liquids to penetrate, or does not permit significant penetration of the liquids, into the surface of the non-absorbing substrate.

The non-absorbing example implementations of the substrate 90 stands in sharp contrast to some forms of media, such as paper, which may absorb liquid. The non-absorbing attributes of the substrate 90 may facilitate drying of the ink particles on the media at least because later removal of liquid from the media will not involve the time and expense of attempting to pull liquid out of the substrate (as occurs with an absorbing substrate) and/or the time, space, and expense of providing heated air for extended periods of time to dry liquid in an absorptive substrate.

Via the example arrangements, the example device and/or associated methods can form (e.g. print) images on a non-absorbing substrate (or some other substrate) with minimal bleeding, dot smearing, etc. while permitting high quality color on color printing. Moreover, via these examples, image formation on a non-absorbing substrate (or some other substrate) can be performed with less time, less space, and less energy at least due to a significant reduction in drying time and capacity. These example arrangements stand in sharp contrast to other printing techniques, such as high coverage, aqueous-based inkjet printing onto non-absorbing substrate for which bleeding, dot smearing, cockling, etc. may yield relatively lower quality results, as well as unacceptably high cost, longer times, etc. associated with drying.

In some such examples, the non-absorptive substrate 90 may comprise other attributes, such as acting as a protective layer for items packaged within the media. Such items may comprise food or other sensitive items for which protection from moisture, light, air, etc. may be desired.

With this in mind, in some examples the substrate 90 may comprise a plastic media. In some examples, the substrate 90 may comprise polyethylene (PET) material, which may comprise a thickness on the order of about 10 microns. In some examples, the substrate 90 may comprise a biaxially oriented polypropylene (BOPP) material. In some examples, the substrate 90 may comprise a biaxially oriented polyethylene terephthalate (BOPET) polyester film, which may be sold under trade name Mylar in some instances. In some examples, the substrate 90 may comprise other types of materials which provide at least some of the features and attributes as described throughout the examples of the present disclosure. For examples, the substrate 90 or portions of substrate 90 may comprise a metallized foil or foil material, among other types of materials.

In some examples, substrate 90 comprises a flexible packaging material. In some such examples, the flexible packaging material may comprise a food packaging material, such as for forming a wrapper, bag, sheet, cover, etc. As previously mentioned for at least some examples, the flexible packaging materials may comprise a non-absorptive media.

In some examples in which a media is supplied in a roll-to-roll arrangement or similar arrangements, the image formation device may sometimes be referred to as a web press and/or the substrate can be referred to as a media web.

In some examples, the substrate may comprise a print medium. In some such examples, an image may be formed image directly on a print medium, such as without an intermediate transfer member or temporary substrate. Accordingly, in some instances, the image formation may sometimes be referred to as occurring directly on the print medium. However, this does not necessarily exclude some examples in which an additive layer may be placed on the print medium prior to receiving ink particles (within a liquid carrier) onto the print medium. In some instances, the print medium also may sometimes be referred to as a non-transfer medium to indicate that the medium itself does not comprise a transfer member (e.g. transfer blanket, transfer drum) by which an ink image is to be later transferred to another print medium (e.g. paper or other material). In this regard, the print medium may sometimes also be referred to as a final medium or a media product. In some such instances, the medium may sometimes be referred to as product packaging medium.

In some examples, the non-transfer medium may sometimes be referred to as a non-transfer substrate, i.e. a substrate which does not act as a transfer member (e.g. a member by which ink is initially received and later transferred to a final substrate bearing an image).

Figure 3B:
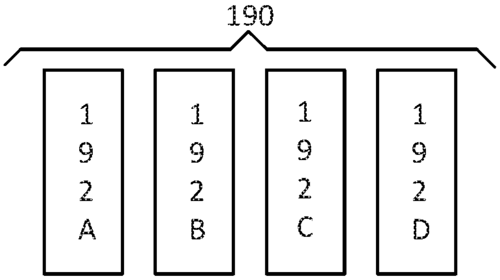
FIG. 3B is a diagram schematically representing multiple example fluid ejection elements.

FIG. 3B is a diagram including a side view schematically representing an example fluid ejection device 190, which comprise at least some of substantially the same features and attributes as fluid ejection device 80 as previously described in association with FIGS. 1, 2A. In some examples, fluid ejection device 190 may comprise an example implementation of fluid ejection device 80 in association with at least FIGS. 1, 2A. As shown in FIG. 3B, in some examples, the fluid ejection device 190 comprises a series of fluid ejection elements (e.g. printheads) 192A, 192B, 192C, 192D arranged on the frame portion 60 in series, with each fluid ejection element provides one color ink of a plurality of different color inks onto the media.

In some examples, each different fluid ejection element 192A-192D provides for at least partial formation of an image on substrate 90 by a respectively different color ink. Stated differently, the different fluid ejection elements 192A, 192B, 192C, 192D apply different color inks such that a composite of the differently colored applied inks forms a complete image on substrate 90 as desired. In some examples, the different color inks correspond to the different colors of a color separation scheme, such as Cyan (C), Magenta (M), Yellow (Y), and black (K) wherein each different color is applied separately as a layer to the substrate 90 as relative movement occurs between the frame portion 60 and the substrate 90. In some examples, the fluid ejection device 190 may comprise a fewer number or a greater number of fluid ejection elements (e.g. printheads) than shown in FIG. 3B.

In some examples, as further described later in association with at least FIG. 11B, among directing other and/or additional operations, a control portion 1100 is instruct, or to cause, the fluid ejection device 80 to deliver the droplets of ink particles 134 within the non-aqueous liquid carrier 132 onto the media 24 (FIG. 2A), to cause operation of emitters 70, 72 to emit airborne charges 71, 73 (FIG. 1) with an appropriate polarity (e.g. negative or positive), apply energy to remove liquid (FIG. 2D), etc.

Figure 4A:
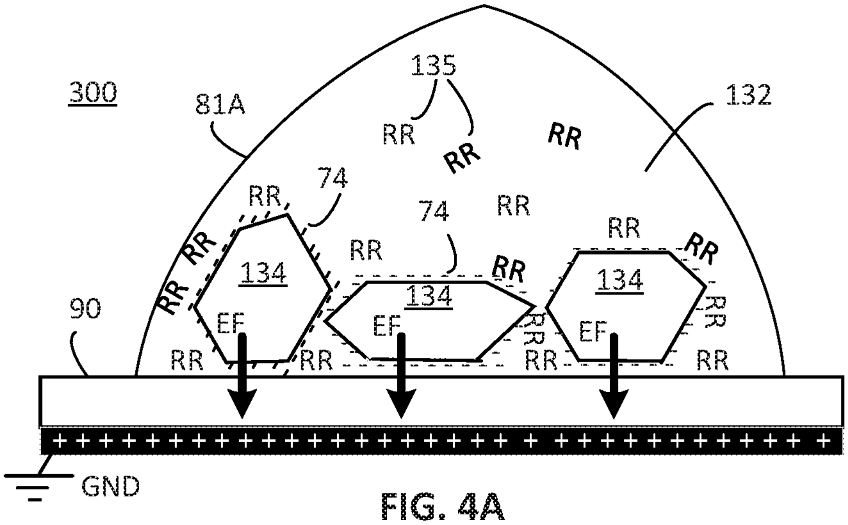
FIG. 4A is a diagram including a side view schematically representing an example image formation including electrostatic fixation of ink particles.

FIG. 4A is a diagram 300 including a side view schematically representing at least some aspects of an example image formation including electrostatic fixation of ink particles, including but not limited to at least some of substantially the same features and attributes as previously described in association with at least FIGS. 2A-2C.

In at least some examples, FIG. 4A schematically depicts a droplet 81A deposited (via fluid ejection device 80) onto substrate 90 and after charges 73 have caused electrostatic migration and fixation of ink particles 134 relative to substrate, with directional force arrow EF representing the electrostatic forces exerted by charges 73 to fix the ink particles 134 relative to the substrate 90. In the particular example shown, the charges 73 are negative charges. However, in some examples, the charges 73 may be positive charges such as shown in other Figures throughout examples of the present disclosure.

It will be understood that the droplet 81A shown in FIG. 4A may in some instances correspond to several droplets 81A which have joined together on the surface 93 of substrate 90. It will be further understood that while the various Figures, such as FIGS. 4A-4B depict just a few ink particles for illustrative simplicity, a typical droplet 81A may comprise many more ink particles 134 than shown in FIGS. 4A-4B.

In addition, FIG. 4A depicts resin (RR) 135 in a dissolved state within the liquid carrier 132 forming droplet 81A. In this dissolved state, the resin 135 does not individually encapsulate each ink particle 134. In general terms, as represented by the number of letters R (e.g. two letters), the resin (RR) 135 in FIG. 4A corresponds to a relatively short chain molecules of resin 135, such as but not limited to a molecular weight in the range of 40 to 10,000. In this arrangement, the charges 73/74 do not become attached to the resin (RR) 135.

Figure 4B:
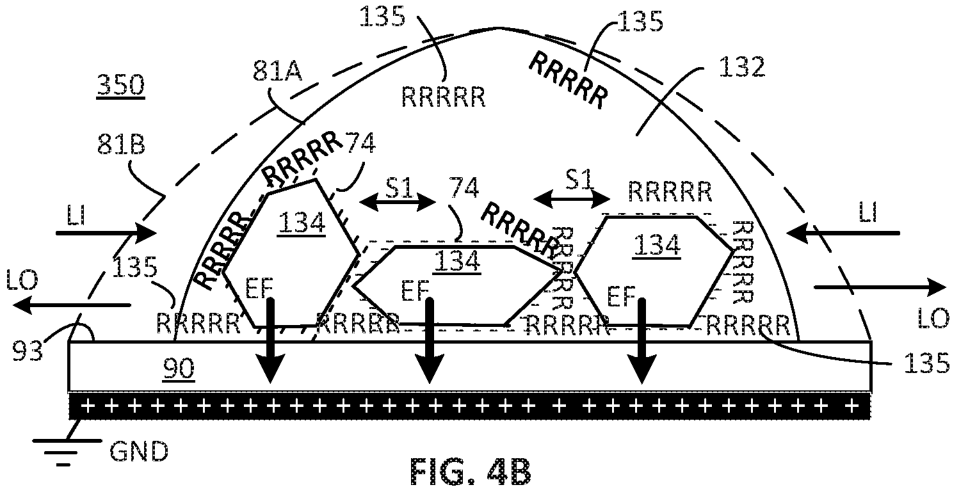
FIG. 4B is a diagram including a side view schematically representing an example image formation including further fixation of ink particles via radiation of a dissolved resin in deposited droplets.

FIG. 4B is a diagram 350 including a side view schematically representing at least some aspects of example image formation including further fixation of ink particles 134 via application of radiation. In particular, as shown in FIG. 4B, after a brief period of time after the deposition of the droplet 81A (FIG. 4A), the droplet 81A may begin to spread laterally on the surface 93 of substrate 90, as represented by dashed line 81B and the directional force arrows LO. If left unchecked, such lateral spreading of the droplet 81A may result in lateral spreading of the ink particles 134 within the droplet 81A (as represented by directional force arrows 51), which may cause loss of clarity, resolution of the intended image on substrate 90.

However, in accordance with at least some examples of the present disclosure, upon application of radiation via a radiation element (e.g. 50 in FIG. 1, 2D), the resin (RR) 135 (FIG. 4A) is at least partially polymerized into longer chain resin (RRRR) 135 within the liquid carrier 132, which has the effect of increasing the viscosity of the liquid carrier 132. This increased viscosity, in turn, inhibits lateral spreading (represented by directional force LI) of the liquid carrier 132, which, in turn prevents lateral spreading of the ink particles 134 to help retain the ink particles 134 in their intended position to achieve the desired image on substrate 90. In at least some examples, this polymerization may comprise a partial polymerization of the resin (RRRR) 135 within the liquid carrier 132, with additional polymerization being performed later, as further described below, such as (but not limited to) in association with at least FIG. 7. However, in some examples, such polymerization as represented in FIG. 4B may comprise a complete polymerization of at least some or all of the resin (RRRR) 135 within the liquid carrier 132 on substrate 90.

In some such examples as represented in FIG. 4B, the at least partially polymerized resin (RRRR) 135 may have a chain length characterized by a molecular weight of 100 to 1,000,000.

Some examples of image formation according to the examples of FIGS. 4A-4B comprise additional drying (e.g. heat) to remove the liquid carrier 132, such as via evaporation, and may further comprise additional polymerization of the resin 135 to further and/or completely cure the resin 135. This further polymerization also acts to further fix the ink particles 134 in their intended locations on the substrate 90, which may further enhance image quality, clarity, etc. One example of such further polymerization may comprise use of a radiation element which acts some period of time later, such as but not limited to the third radiation element 655 as in the example of FIG. 7.

Figure 5A:
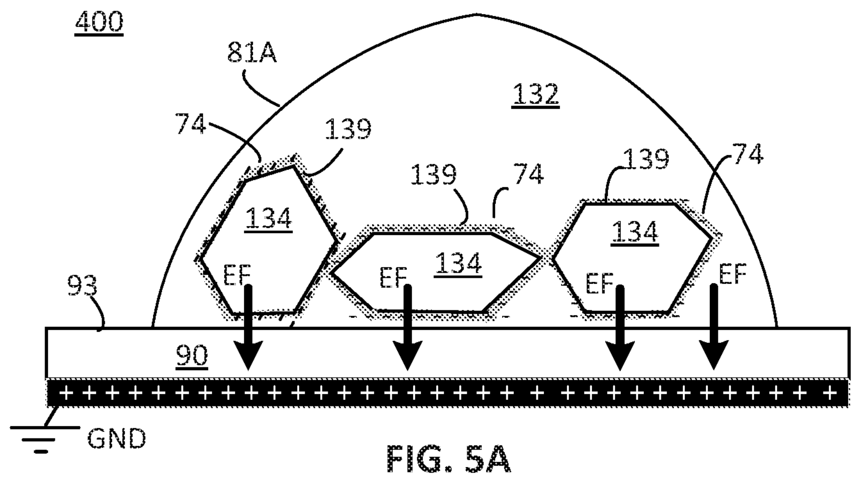
FIG. 5A is a diagram including a side view schematically representing an example image formation including electrostatic fixation of ink particles.

FIG. 5A is a diagram 400 including a side view schematically representing at least some aspects of example image formation including electrostatic fixation of ink particles. In some examples, the image formation shown in FIG. 5A may comprise at least some of substantially the same features and attributes as the example image formation shown in FIGS. 4A-4B, except with a resin (RR) 137 being dispersed within the liquid carrier 132 of deposited droplets 81A, unlike the dissolved resin 135 in FIGS. 4A-4B. As shown in FIG. 5A, in some such examples the dispersed resin (RR) 137 acts a coating to encapsulate each ink particle 134, as represented by the shaded border 139 of each ink particle 134. The electrostatic forces EF, created by the emitted charges 74, act to electrostatically fix the ink particles 134 relative to the substrate 90, as in FIG. 4A-4B. However, as shown in FIG. 5A-5D, with the ink particles 134 encapsulated by the resin 137 (e.g. as coating 139), the charges 74 act on the resin 137 to electrostatically fix the ink particles 134 relative to the substrate 90.

Figure 5B:
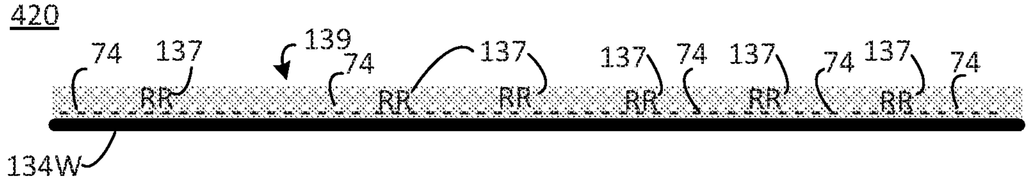
FIG. 5B is a diagram including a side view schematically representing further aspects of the example image formation in FIG. 5A, including a resin coating encapsulating an ink particle in deposited droplets.

FIG. 5B is a diagram 420 including a partial side view schematically representing an example image formation to further illustrate one of the outer walls 134W of an ink particle 134 (seen in FIG. 5A) as encapsulated by coating 139 of resin 137 and the charges 74 (negative in this example) which are electrostatically attached to the resin 137, and which are electrostatically attracted and fixed relative to the substrate 90 (shown in FIG. 5A). It will be understood that the resin 137 and/or charges 74 depicted in FIG. 5B appear with generous spacing for illustrative clarity and simplicity, and that as such, the number and/or location of resin (particles) 137 and/or charges 74 may be more dense than shown or less dense than shown. It will be understood that the arrangement illustrated by FIG. 5B is applicable to all (or substantially all) of the outer surface (e.g. outer walls) of the ink particles 134 in FIG. 5A. It will be further understood that the walls shown in FIGS. 5A-5B are simplified for illustrative clarity, and that the ink particles 134 may have shapes with irregularly shaped walls.

Figure 5C:
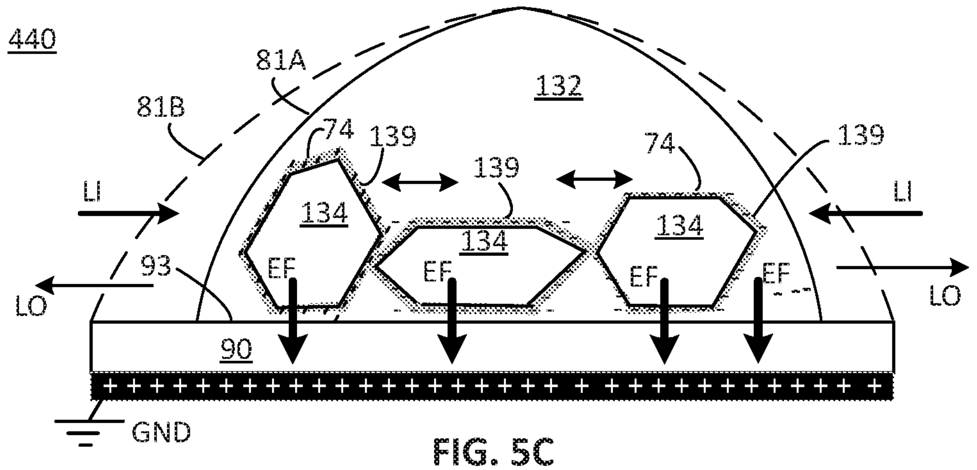
FIG. 5C is a diagram including a side view schematically representing an example image formation including further fixation of ink particles via radiation.
Figure 5D:
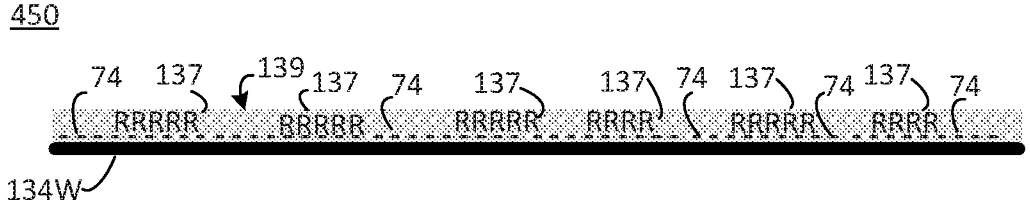
FIG. 5D is a diagram including a side view schematically representing further aspects of the example image formation in FIG. 5C, including a resin coating encapsulating an ink particle.

As further shown in the diagram 440 of FIG. 5C and the diagram 450 of FIG. 5D, upon application of radiation, such as via radiation element 50 (FIG. 2D), the resin (RR) 137 is at least partially polymerized into longer chain resin (RRRR) 137, which further fixes the ink particles 134 relative to the substrate 90 in the manner and with the effects, previously described in association with at least FIGS. 2D, 4A-4B.

With this in mind, the diagram 450 of FIG. 5D depicts an example image formation comprising substantially the same features and attributes as shown in FIG. 5B, except further depicting the at least partial polymerization of the resin 137 (forming coating 139) on the outer wall(s) 134W of the ink particles 134.

It will be understood that the application of heat may initially and/or further polymerize the resin in some instances, such as when the resin may comprise a heat-polymerizable resin component.

Figure 5E:
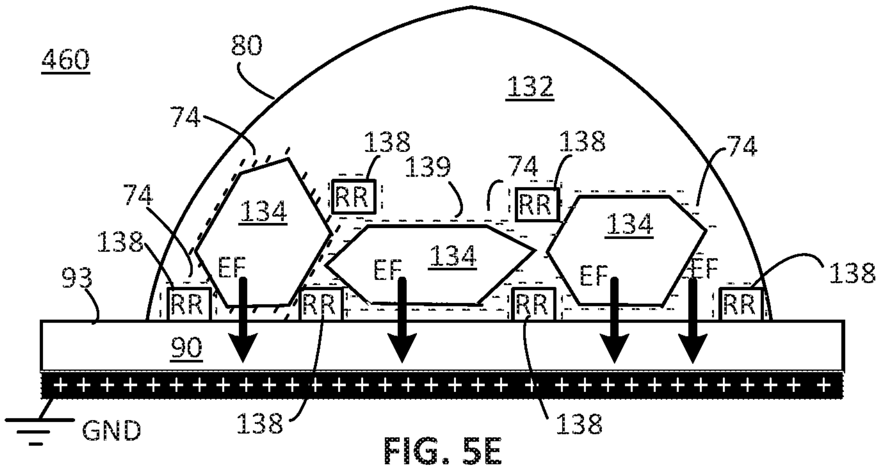
FIGS. 5E-5F are a series of diagrams including a side view schematically representing an example image formation including further fixation of ink particles via radiation of dispersed resin particles in deposited droplets.

FIG. 5E is a diagram 460 including a side view schematically representing at least some aspects of example image formation including electrostatic fixation of ink particles 134 and dispersed resin particles 138. In some examples, the example image formation shown in FIG. 5E may comprise at least some of substantially the same features and attributes as the example image formation shown in FIGS. 4A-4B, except with the deposited droplets 81A including a resin in the form of dispersed resin particles 138 within the liquid carrier 132, instead of the dissolved resin 135 in FIGS. 4A-4B and/or instead of the dispersed encapsulation form of resin 137 in FIGS. 5A-5D.

As shown in FIG. 5E, upon application of charges 74 in a manner similar to that represented in FIGS. 2B-2C, FIGS. 4A, 5A, the electrostatic forces EF, created by the emitted charges 74, act to electrostatically fix the ink particles 134 relative to the substrate 90. Moreover, as shown in FIG. 5E, the charges 74 also act to electrostatically fix the dispersed resin particles 138 relative to the substrate 90.

Figure 5F:
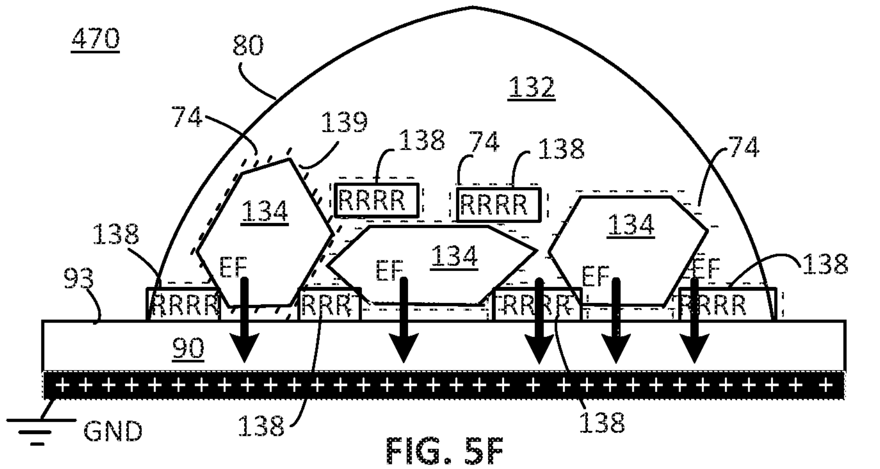

As further shown in the diagram 470 of FIG. 5F, upon application of radiation (in a manner previously described in association with at least FIG. 2D, 4B, 5C-D) onto the deposited droplets 81A, the radiation causes at least partial polymerization of the resin particles 138 to form longer chain resin particles 138. As previously noted in association with at least FIGS. 1, 2D, 4B, etc., this at least partial polymerization of resin particles 138 acts to further fix the ink particles 134 relative to the substrate 90. As previously noted in association with the previous examples, the at least partial polymerization of the resin particles 138 (as represented by FIG. 5F) causes increased viscosity of the liquid carrier 132 of the deposited droplets 81A, which inhibits lateral movement of the ink particles 134, thereby resulting in the further fixation of the ink particles 134. Moreover, as previously noted elsewhere, this further fixation of the ink particles 134 (via the radiation of the resin particles 138) may sometimes be referred to as chemically pinning the ink particles 134 relative to the substrate 90.

Figure 5G:
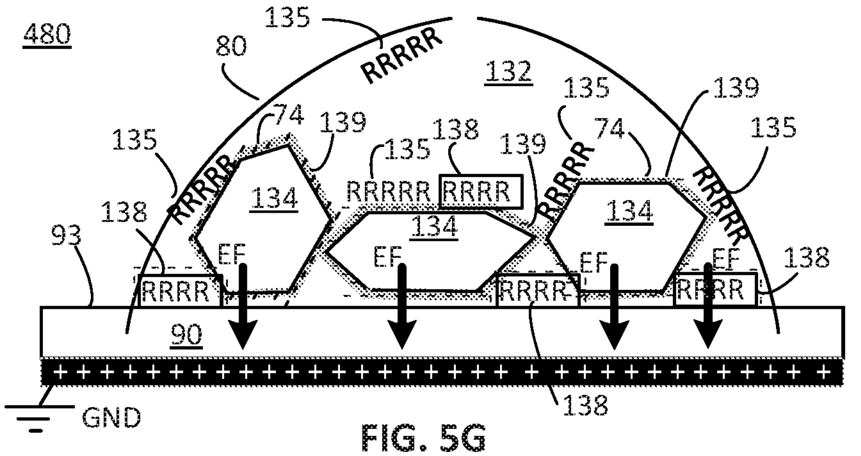
FIG. 5G is a diagram including a side view schematically representing an example image formation including further fixation of ink particles via radiation of several forms of resin in deposited droplets.

FIG. 5G is a diagram 480 including a side view schematically representing at least some aspects of example image formation including electrostatic fixation of ink particles 134 and radiation of deposited droplets 81A which includes several forms of resin. In some examples, the example image formation shown in FIG. 5E may comprise at least some of substantially the same features and attributes as the example image formation shown in FIGS. 4A-4B, FIGS. 5A-5D, and FIGS. 5E-5F. However, in this example image formation, the droplets 81A are deposited including three different forms of resin, namely, the dissolved resin 135 (FIGS. 4A-4B, dispersed resin as coating 139 (FIGS. 5A-5D), and the dispersed resin particles 138 (FIGS. 5E-5F). Accordingly, the example image formation depicted in FIG. 5G represents implementing further fixation of ink particles 134 (after electrostatic fixation via emitted charges 74) via application of radiation to all three different forms of resin, including the dissolved resin 135 in FIGS. 4A-4B, the dispersed resin 137 to encapsulate (e.g. coating 139) the ink particles 134 in FIGS. 5A-5D, and the dispersed resin particles 138 in FIGS. 5E-5G.

While FIG. 5G depicts three different forms of resins (e.g. dissolved resin 135, dispersed resin 135 as coating 139, and dispersed resin particles 138), it will be understood that in some examples just two of three different forms of resin may be present to further fix (upon application of radiation) the ink particles 134 relative to the substrate.

Figure 6A:
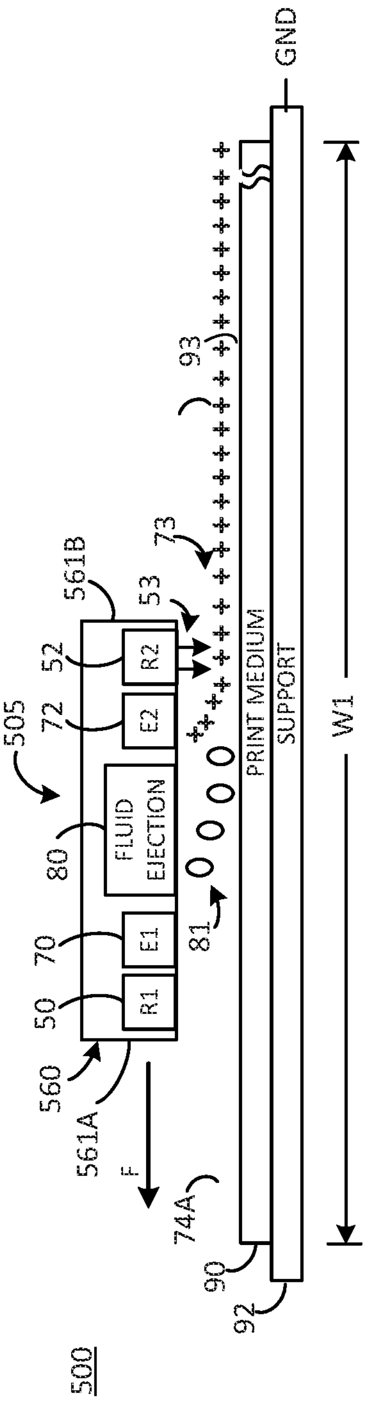
FIGS. 6A-6B are a series of diagram including a side view schematically representing example image formation in a scanning-type image formation device.
Figure 6B:
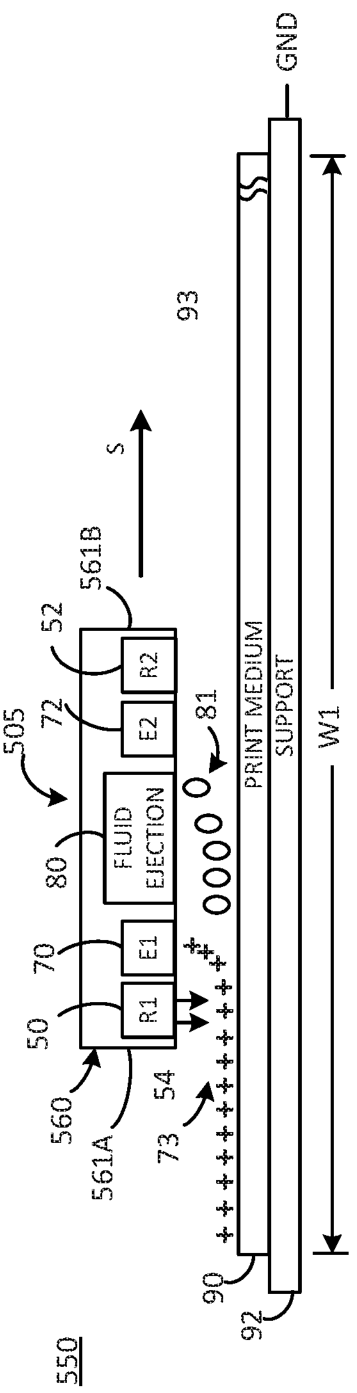

FIGS. 6A-6B are a series of diagrams 500, 550 including a side view schematically representing image formation for an example scanning image formation device 505 and/or example method of image formation. In some examples, the scanning image formation device 500 may comprise at least some of substantially the same features and attributes as the example image formation devices and/or methods as previously described in association with at least FIGS. 1-5B, and specifically comprising various image formation elements supported on a scanning carriage 560, among other variations.

Accordingly, as shown in FIG. 6A, the scanning image formation device 505 comprises a frame portion (e.g. 60 in FIG. 1) implemented as at least a scanning carriage 560. The carriage 560 supports a first emitter (E1) 70 and a second emitter (E2) 72, with a fluid ejection device 80 interposed between respective first and second emitters 70, and 72. The scanning carriage 560 is movable in a back-and-forth scanning motion relative to the substrate 90, such as in a first direction (F) shown in FIG. 6A and an opposite second direction (S), as shown in FIG. 6B. Upon the scanning carriage 560 moving in a first pass in the first direction (F), fluid ejection device 80 deposits droplets 81 of ink particles 134, with resin (e.g. 135 in FIGS. 4A-4B; 137/139 in FIGS. 5A-5D; 138 in FIGS. 5E-5F), in a non-aqueous liquid carrier (e.g. 132) onto the substrate 90. As the scanning carriage 560 continues to move following the deposition of droplets 81, the second emitter 72 emits airborne charges 73 to electrostatically fix the deposited ink particles 134 relative to the substrate 90. In some such examples, in its leading position, the first emitter 70 does not emit charges during scanning passes in the first direction F.

Similarly, upon the scanning carriage 560 moving in a second pass in the opposite second direction, after deposition of droplets 81 via the fluid ejection device 80, the first emitter 70 emits the airborne charges 73 to electrostatically fix the deposited ink particles 73 relative to the substrate 90. In some such examples, in its leading position, the second emitter 72 does not emit charges during scanning passes in the second direction S.

In some examples, the first emitter 70 and the second emitter 72 are both spaced apart by a predetermined distance from the fluid ejection device 80 (from which the droplets 81 are received) in order to delay the electrostatic fixation (per operation of second emitter 72 or of first emitter 70 depending on the direction of movement F or S), which can increase a dot size on substrate 90, which in turn may lower ink consumption.

As further shown in FIGS. 6A-6B, and as previously noted, the scanning carriage 560 also supports at least one radiation element, such as a first radiation element (R1) 50 and a second radiation element (R2) 52, with the first radiation element (R1) 50 interposed between the first emitter 70 and a first end 561A of the carriage 560 and with the second radiation element (R2) 52 interposed the second emitter 72 and an opposite second end 561B of the carriage 560. Upon the scanning carriage 560 moving in the first pass in the first direction (F) as already described for FIG. 6A, following the emission of airborne charges via the second emitter 72, the second radiation element 52 is to emit radiation to cause further fixation of the deposited ink particles (e.g. 134 as in FIGS. 4A-4B, 5A-5D) relative to the substrate 90. In some such examples, in its leading position, the first radiation element 50 does not emit radiation during scanning passes in the first direction F.

Similarly, upon the scanning carriage 560 moving in the second pass in the opposite second direction (S) in a manner similar to already described for FIG. 6A, following the emission of airborne charges via the first emitter 70, the first radiation element 50 is to emit radiation to cause further fixing of the deposited ink particles (e.g. 134 as in FIGS. 4A-4B, 5A-5D) relative to the substrate 90. In some such examples, in its leading position, the second radiation element 52 does not emit radiation during scanning passes in the second direction S.

It will be understood that additional, subsequent passes like those in FIGS. 6A-6B will continue to be made until the desired image is formed on the substrate 90.

As previously mentioned, application of radiation onto the deposited droplets shortly after the application of airborne charges (to electrostatically fix the ink particles 134 relative to the substrate) inhibits lateral spreading of the droplets 81 and ink particles 134 to help preserve image quality, clarity, etc.

Figure 7A:
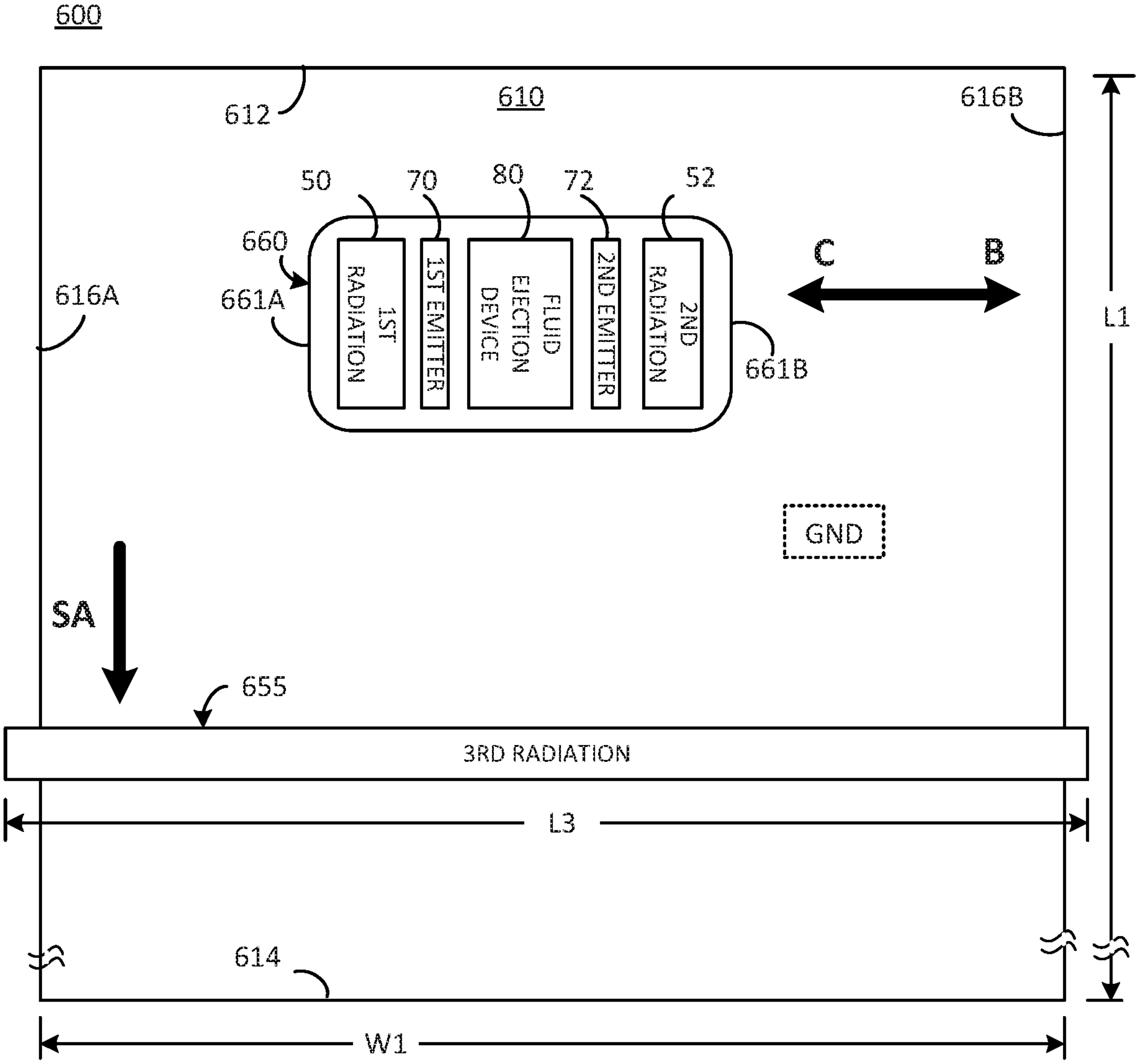
FIG. 7A is a diagram including a top view schematically representing an example scanning-type image formation device.

FIG. 7A is a diagram schematically representing an example image formation device 600. In some examples, the image formation device 600 may comprise at least some of substantially the same features and attributes as the image formation devices previously described in association with at least FIGS. 1A-6B. Accordingly, in some examples, the carriage 660 supports a fluid ejection device 80, first and second emitters 70, 72, and first and second radiation elements 50, 52 in a manner substantially the same as described in association with at least FIGS. 6A-6B.

In some examples, the image formation device 600 shown in FIG. 7A comprises a scanning-type image formation device 600 in which a carriage 660 moves in a back-and-forth motion (as represented by directional arrows B, C) across a width (W1) of a substrate 610. In some examples, the substrate 610 may comprise a continuous sheet or web of material while in some examples, the substrate 610 may comprise a discrete print medium, such as a sheet of paper. In some examples, the scanning carriage 660 may sometimes be referred to as a frame portion.

In some examples, the image formation device 800 may comprise a third radiative element 655 to further polymerize the resin (e.g. 135 in FIG. 4A-4B; 137/139 in FIGS. 5A-5D; 138 in FIGS. 5E-5F) on substrate 610 after the substrate 610 moves past the scanning carriage 660. In some such examples, the third radiative element 655 is vertically spaced apart from the substrate 610, and comprises a length L3 which extends across a width (W1) of, the substrate 610. In some examples, the third radiative element 655 is also in a fixed position relative to a substrate advance direction (SA) and in which the third radiative element 655 is downstream, in the substrate advance direction, from the carriage 660.

Via this arrangement, the third radiation element 655 acts to further irradiate at least the resins (e.g. 135 in FIGS. 4A-4B; 137/139 in FIGS. 5A-5D; 138 in FIGS. 5E-5F; 135, 137/139, 138 in FIG. 5G) on the substrate 90, which further polymerizes the resins and therefore further fixes the ink particles 134 in their intended locations to form an image on the substrate 90.

Figure 7B:
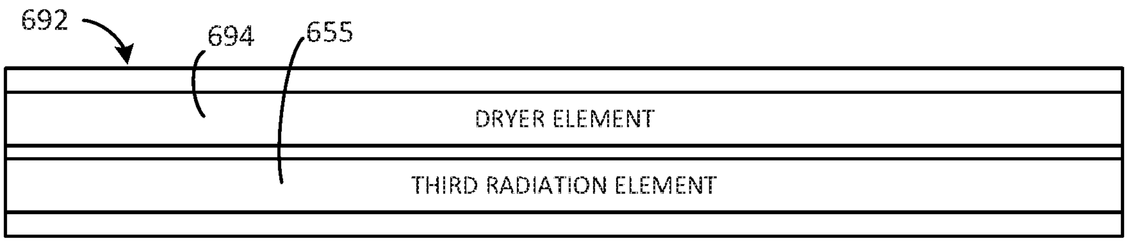
FIG. 7B is a diagram including a top view schematically representing a drying element and radiation element of an example image formation device.

As further shown in the top view of FIG. 7B, in some examples the image formation device 600 (FIG. 7A) may comprise a frame portion 692, which supports a drying element 694 in addition to the third radiation element 655. In some such examples, the drying element 694 is positioned for operation after operation of the respective first and second radiation elements 50, 52 but prior to operation of the third radiation element 655. In some examples, the drying element 694 applies heat, such as via forced air, to cause evaporation of the liquid carrier 132 on the substrate 90 and thereby remove the liquid carrier 132 while leaving the ink particles 134 in their respective electrostatically fixed locations on substrate 90.

Moreover, following operation of the drying element 694, the third radiation element 655 may apply radiation to further polymerize the resin in the manner previously described above with respect to FIG. 7A.

In some examples, the drying element 694 may be supported by a frame portion like frame portion 692 which is separate from, and spaced apart from (along an orientation parallel to the substrate advance direction SA), the third radiation element 655 which may be supported on its own frame portion like frame portion 692.

In some such examples as described in FIGS. 6A-7B, the scanning image formation device 600 may omit a mechanical-type liquid removal element, such as a cold liquid removal element. Stated differently, the scanning image formation device 600 may remove the liquid carrier (e.g. 132 in FIGS. 2A-2C) independent of, or without, a mechanically-based liquid removal element.

In some examples associated with FIG. 7A, the scanning carriage 660 may move a speed of 2 meters/second in its back and forth motion across the width W1 of the substrate 610 while the droplets 81 are deposited, the charges 73 are emitted and radiation 154 is applied onto the substrate 90. During such relatively high speed movement, minimal drying of the deposited components takes place. Meanwhile, as the substrate 90 is advanced in the substrate advance direction (SA), the bulk of the drying of the deposited components on the substrate is performed via drying element 694 at a much lower speed of 1 inch-per-second. In some such examples, and as previously noted, the application of radiation via radiation elements 50, 52 (FIG. 7A) acts to further fix the ink particles 134 relative to the substrate 90 (shortly after the electrostatic fixation of the deposited ink particles) since there will be a delay before a significant amount of drying may take place via the drying element 694 located separately from the carriage 660.

In some examples, the drying element 694 may comprise a heated air element to direct heated air onto at least the liquid carrier 132 and substrate 90. In some examples, the heated air is controlled to maintain the ink particles 134, substrate 90, etc. at a temperature below 60 degrees C., which may prevent deformation of substrate 90, such as cockling, etc.

In some examples, the drying may about 10 times faster than an aqueous-based liquid carrier at least because the non-aqueous liquid carrier 132 (e.g. oil) may be evaporated with a lower input of energy per unit volume. In such examples, this relatively efficient drying may hold true even without the use of a mechanical-type liquid (e.g. cold oil removal). In some such examples, the drying temperature may be limited to 70 degrees C. for plastics having a low glass transition temperature, such as but not limited to biaxially-oriented polypropylene (BOPP).

Figure 8:
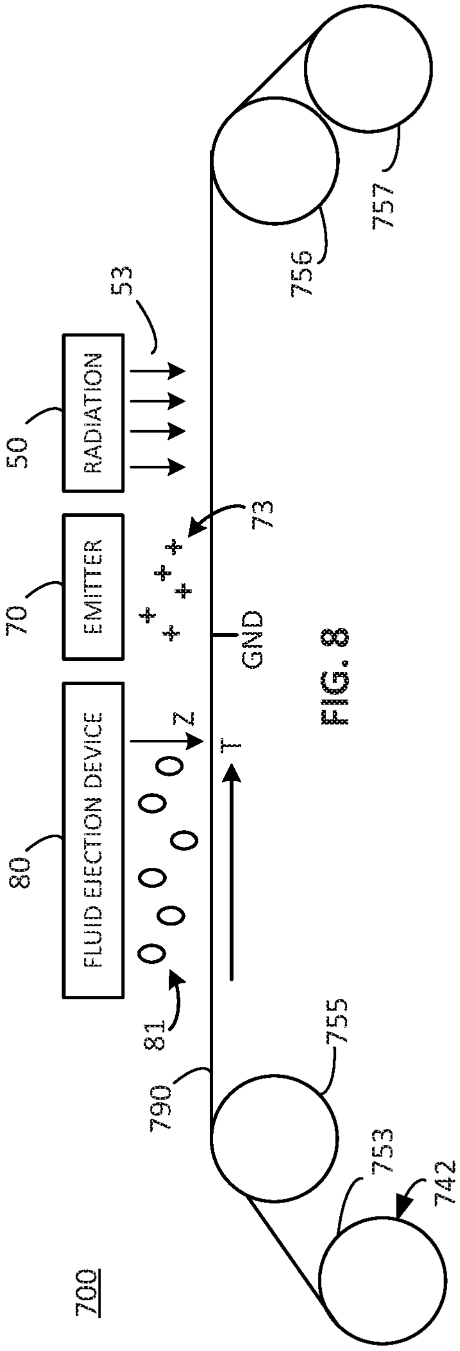
FIG. 8 is a diagram including a side view schematically representing an example image formation device with a roll-to-roll-type substrate.

FIG. 8 is a diagram including a side view schematically representing an example image formation device 700 with a substrate 790 in a roll-to-roll arrangement 742. In some examples, the image formation device 700 may comprise at least some of substantially the same features as the example image formation devices previously described in association with at least FIGS. 1-7B, and comprising the substrate being arranged in the roll-to-roll arrangement 742. As shown in FIG. 8, in some examples the roll-to-roll arrangement 742 comprises a substrate supply 753, support rollers 755, 756, and take-up roller 757. It will be understood that additional rollers may be included such as a support roller on an opposite side of the substrate 790 relative to each of the respective fluid ejection device 80, emitter 70, and/or radiation element 50. In a manner consistent with FIGS. 1-7B, the image formation device 700 comprises a fluid ejection device 80, emitter 70, and radiation element 50 arranged in series along a travel path T through which the substrate 790 moves in order to receive from the fluid ejection device 80 deposited droplets 81 (of ink particles 134 and resin (e.g. 135 in FIGS. 4A-4B, 137/139 in FIGS. 5A-5D; 138 in FIGS. 5E-5F) within a non-aqueous liquid carrier 132), to receive from emitter 70 charges to cause electrostatic fixation of the ink particles 134 relative to the substrate 790, and to receive from radiation element 50 radiation to further fix the ink particles 134 relative to substrate 790 to at least partially form an intended image on the substrate 790. As in the previous examples, the substrate 790 is connected to a ground element GND.

In some such examples, the substrate 790 comprises a non-transfer substrate such that the substrate 790 comprises the final location at which the formed image will reside.

While not shown for illustrative simplicity, it will be understood that an additional radiation element (e.g. 655 in FIGS. 7A-7B), a drying element (e.g. 694 in FIG. 7B), and/or both a drying element and additional radiation element (e.g. 694, 655 in FIG. 7B) may be positioned after (e.g. downstream) and operate after the radiation element 50. The additional radiation element and/or drying element may be used to further fix (e.g. via polymerization of resin) the ink particles 134 relative to the substrate 890 and/or to evaporate the liquid carrier 132 from the substrate 890.

Figure 9:
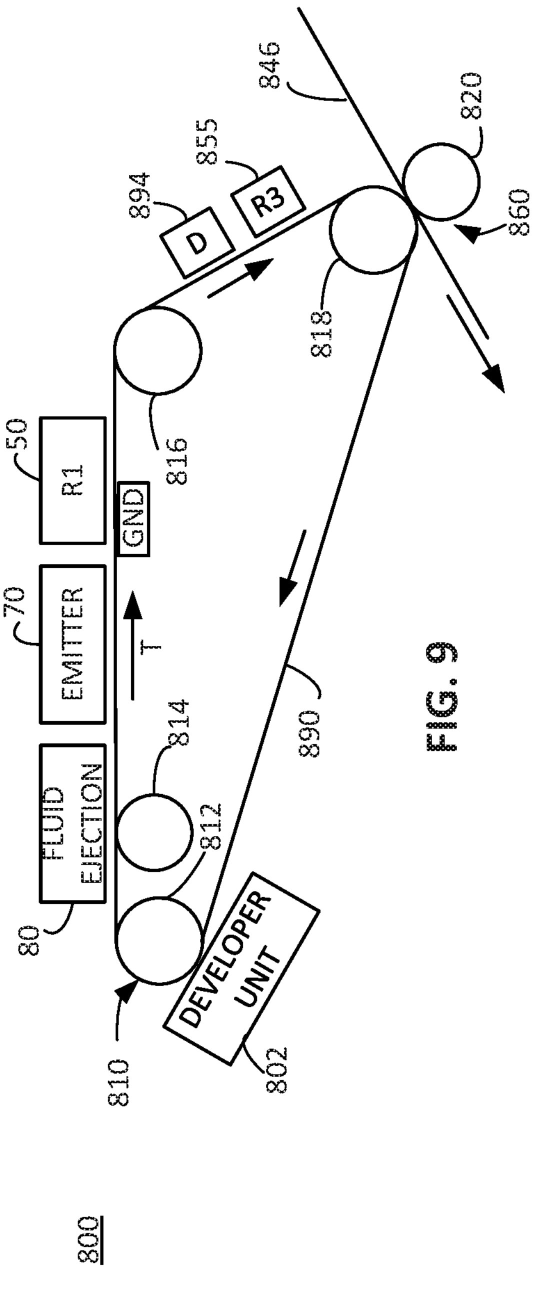
FIG. 9 is a diagram including a side view schematically representing an example image formation device with a belt-type substrate.

FIG. 9 is a diagram including a side view schematically representing an example image formation device 800 with a substrate 890 arranged in a belt configuration. In some examples, the image formation device 800 may comprise at least some of substantially the same features as the example image formation devices previously described in association with at least FIGS. 1-8, except for the substrate 890 being specifically arranged in an endless belt arrangement. As shown in FIG. 9, the belt arrangement 810 includes rollers 812, 814, 816, 818, with at least one of these respective rollers comprising a drive roller and the remaining rollers supporting and guiding the substrate 890. Via these rollers, the substrate 890 continuously moves in travel path T to expose the substrate 890 to at least the fluid ejection device 80, emitter 70, and radiation element 50 as previously described in association with at least FIG. 8 and/or other examples.

In a manner consistent with FIGS. 1-8, the image formation device 800 comprises a fluid ejection device 80, emitter 70, and radiation element 50 arranged in series along a travel path T through which the substrate 890 moves in order to receive from the fluid ejection device 80 deposited droplets 81 (of ink particles 134 and resin within a non-aqueous liquid carrier 132), to receive from emitter 70 charges to cause electrostatic fixation of the ink particles 134 relative to the substrate 890, and to receive from radiation element (R1) 50 radiation to further fix the ink particles 134 relative to substrate 890 to at least partially form an intended image on the substrate 890. As in the previous examples, the substrate 890 is connected to a ground element GND to facilitate the electrostatic migration and fixation of the ink particles 134 relative to the substrate 890.

As further shown in FIG. 9, the image formation device 800 comprises a drying element (D) 894 and an additional radiation element (R3) 855, which may comprise at least some of substantially the same features and attributes as the drying element 694 and radiation element 655, respectively, as previously described in association with FIG. 7B.

As further shown in FIG. 9, roller 818 may comprise an impression roller or cylinder which forms a nip 860 with roller 820 to cause transfer of the formed image on substrate 890 to print medium 846.

As further shown in FIG. 9, in some examples the image formation device 800 comprises a developer unit 802 which precedes (i.e. is upstream from) the fluid ejection device 80 and which may deposit a primer layer or layer of binder material onto the substrate 890 and onto which the image may be formed (via operation of fluid ejection device 80, emitter 70, radiation element 50, drying element 894, radiation element 855). In some examples, this primer layer or binder layer may be transferred with the formed image onto the print medium 846. In some such examples, the deposited layer from developer unit 802 may be charged in a manner to facilitate the electrostatic migration and fixation of ink particles 134 relative to the binder layer and substrate 890.

Figure 10:
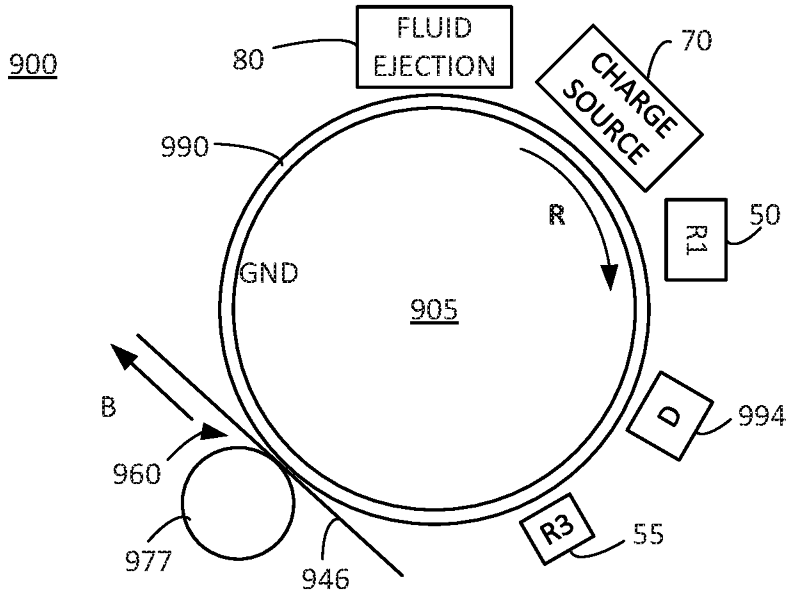
FIG. 10 is a diagram including a side view schematically representing an example image formation device with a drum-type substrate.

FIG. 10 is a diagram including a side view schematically representing an example image formation device 900. In some examples, the image formation device 900 may comprise at least some of substantially the same features as the example image formation devices previously described in association with at least FIGS. 1-9, except for comprising the substrate being specifically arranged in a drum-type arrangement. In a manner consistent with FIGS. 1-9, the image formation device 900 comprises a fluid ejection device 80, emitter 70, and radiation element 50 arranged in series about an external surface of substrate 990 which rotates (as represented by arrow R) in order to receive from the fluid ejection device 80 deposited droplets 81 (of ink particles 134 and resin (e.g. 135, 137/139, 138) within a non-aqueous liquid carrier 132), to receive from emitter 70 charges to cause electrostatic fixation of the ink particles 134 relative to the substrate 990, and to receive from radiation element (R1) 50 radiation to further fix the ink particles 134 relative to substrate 990 to at least partially form an intended image on the substrate 990. As in the previous examples, the substrate 990 is connected to a ground element GND to facilitate the electrostatic migration and fixation of the ink particles 134 relative to the substrate 990.

As further shown in FIG. 10, in some examples the image formation device 900 also comprises a drying element (D) 994 and an additional radiation element (R3) 955, which may comprise at least some of substantially the same features and attributes as the drying element 694 and radiation element 655, respectively, as previously described in association with FIG. 7B or the drying element 894 and radiation element 855 in FIG. 9.

As further shown in FIG. 10, the image formation device 900 may comprise an impression roller or cylinder 977 which forms a nip 970 with drum 905 to cause transfer to the formed image on substrate 990 of drum 905 to print medium 946.

In some examples, in a manner similar to the example in FIG. 9, the image formation device 900 also may comprise a developer unit (e.g. 802 in FIG. 9) which precedes the fluid ejection device 80 to deposit a primer or binder layer to receive the deposited droplets, electrostatic charges, etc.

Figure 11A:
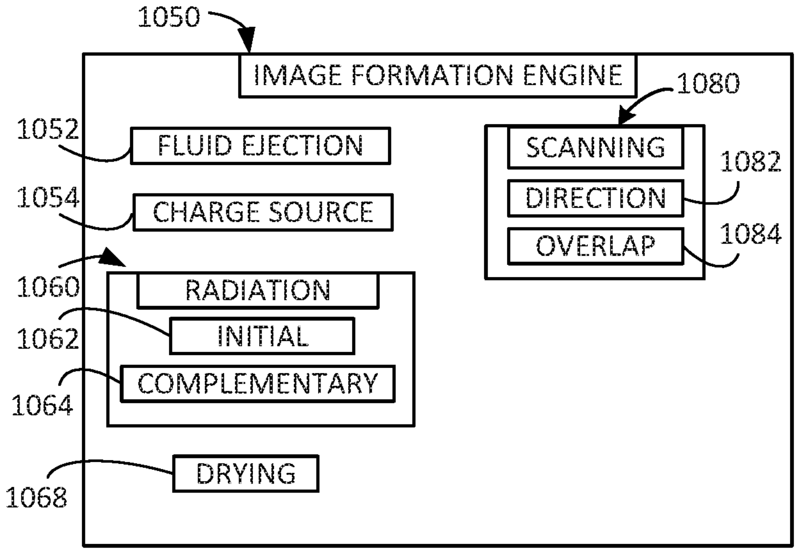
FIG. 11A is a block diagram schematically representing an example image formation engine.

FIG. 11A is a block diagram schematically representing an example image formation engine 1050. In some examples, the image formation engine 1050 may form part of a control portion 1100, as later described in association with at least FIG. 11B, such as but not limited to comprising at least part of the instructions 1111. In some examples, the image formation engine 1050 may be used to implement at least some of the various example devices and/or example methods of the present disclosure as previously described in association with FIGS. 1-10 and/or as later described in association with FIGS. 11B-12. In some examples, the image formation engine 1050 (FIG. 11A) and/or control portion 1100 (FIG. 11B) may form part of, and/or be in communication with, an image formation device.

In general terms, the image formation engine 1050 is to control at least some aspects of operation of the image formation devices as described in association with at least FIGS. 1-10 and 11B-12.

As shown in FIG. 11A, in some examples the image formation engine 1050 may comprise a fluid ejection engine 1052, a charge source engine 1054, a radiation engine 1060, a drying engine 1068, and/or a scanning engine 1080. In some examples, the fluid ejection engine 1052 controls operation of the fluid ejection device (e.g. 80) to deposit droplets of ink particles 134 and resin within a liquid carrier 132 onto a substrate (e.g. 90 in FIG. 1) as described throughout the examples of the present disclosure. In some such examples, the fluid ejection engine 1052 also may track and/or control a volume, concentration, etc. of resin and/or liquid carrier, which forms part of the droplets ejected by the fluid ejection device.

In some examples, the charge source engine 1054 controls operation of the charge source (e.g. emitter 50) to emit airborne electrical charges to induce electrostatic migration of ink particles (e.g. 134) toward the substrate (e.g. 90) and electrostatic fixation of the migrated ink particles at their target locations in a pattern at least partially forming an image, such as described in association with FIGS. 1-10.

In some examples, the radiation engine 1060 controls operation of the radiation elements (e.g. 50 in FIG. 1; 50, 52 in FIGS. 6A-7; etc.) to emit radiation (e.g. UV, infrared, visible, etc.) toward and onto the substrate (e.g. 90). Among other effects, such radiation may cause at least partial polymerization of the resin (e.g. within the droplets deposited on the substrate). Accordingly, the radiation engine 1060 may control a volume, intensity, etc. of the emitted radiation in order to control a degree of the polymerization of the resin on the substrate and/or which encapsulates the ink particles (e.g. FIGS. 5A-5D). Moreover, the radiation engine 1060 may control operation, timing, etc. of multiple radiation elements, such as the first, second, and/or third radiation elements (e.g. 50, 52, 55, 694), as described in association with at least FIGS. 6A-10.

In some examples, the radiation engine 1060 may comprise an initial polymerization parameter 1062 to track and/or control initial polymerization of the resin (e.g. within the deposited droplets) by the radiation element (e.g. 50 in FIG. 1, 50, 52 in FIGS. 6A-7B) during the at least partial polymerization of the resin to further fix the ink particles (e.g. 134) relative to the substrate (e.g. 90), as described throughout the examples of the present disclosure. Meanwhile, in some examples, the radiation engine 1060 may comprise a complementary polymerization parameter 1064 to track and/or control further polymerization of the at least partially polymerized resin as caused by a third radiation element such as element 655 in FIGS. 7A-7B, 855 in FIG. 9, 955 in FIG. 10. In some such examples, this further polymerization may comprise a complete or substantially complete polymerization of the resin (e.g. within the deposited droplets on the substrate).

In some examples, the drying engine 1068 controls operation of elements used to dry the liquid carrier (e.g. 132) on the substrate. In some examples, such drying elements may comprise element 694 in FIG. 7, 894 in FIG. 9, and 994 in FIG. 10. Such elements may cause evaporation via forced heated air and/or via other evaporative-causing elements, wherein the engine 1068 may control the rate of drying, duration of drying, etc. The drying engine 1068 also may control the timing and/or order of operation of drying relative to instances of polymerization of the resin within the deposited droplets.

As further shown in FIG. 11A, in some examples, the image formation engine 1050 may comprise a scanning engine 1080 to track and/or control operation of a scanning image formation device, particularly including, a scanning carriage such as but not limited to the example scanning carriage 560, 660 in FIGS. 6A-7A. Such control may comprise controlling a speed of back-and-forth scanning during the above-described fluid ejection, charge emission, radiation emission, etc. In some examples, the scanning engine 1080 may comprise a direction parameter 1082 to control a direction of scanning and/or an overlap parameter 1084 to control a degree of overlap of successive passes during such scanning-type image formation (e.g. printing).

It will be understood that, in at least some examples, the image formation engine 1050 is not strictly limited to the particular grouping of parameters, engines, functions, etc. as represented in FIG. 11A, such that the various parameters, engines, functions, etc. may operate according to different groupings than shown in FIG. 11A.

Figure 11B:
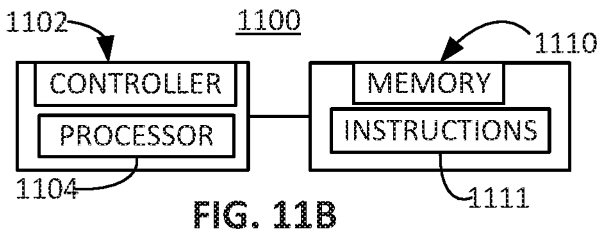
FIG. 11B is a block diagram schematically representing an example control portion.

FIG. 11B is a block diagram schematically representing an example control portion 1100. In some examples, control portion 1100 provides one example implementation of a control portion forming a part of, implementing, and/or generally managing the example image formation devices, as well as the particular portions, fluid ejection devices, charge sources, radiation elements, drying elements, liquid removal elements, carriages, elements, devices, user interface, instructions, engines, parameters, functions, and/or methods, as described throughout examples of the present disclosure in association with FIGS. 1-11A and 11C-12.

In some examples, control portion 1100 includes a controller 1102 and a memory 1110. In general terms, controller 1102 of control portion 1100 comprises at least one processor 1104 and associated memories. The controller 1102 is electrically couplable to, and in communication with, memory 1110 to generate control signals to direct operation of at least some the image formation devices, various portions and elements of the image formation devices, such as fluid ejection devices, charge sources, radiation elements, drying elements, liquid removal elements, carriages, user interfaces, instructions, engines, functions, and/or methods, as described throughout examples of the present disclosure. In some examples, these generated control signals include, but are not limited to, employing instructions 1111 stored in memory 1110 to at least direct and manage depositing droplets of ink particles and liquid carrier to form an image on a media, moving a carriage, jetting droplets, directing charges onto ink particles and/or resin, polymerizing resin, removing liquids, heating or radiating deposited droplets, drying, etc. as described throughout the examples of the present disclosure in association with FIGS. 1-11A and 11C-12. In some instances, the controller 1102 or control portion 1100 may sometimes be referred to as being programmed to perform the above-identified actions, functions, etc. In some examples, at least some of the stored instructions 1111 are implemented as a, or may be referred to as, a print engine, an image formation engine, and the like, such as but not limited to the image formation engine 1050 in FIG. 11A.

In response to or based upon commands received via a user interface (e.g. user interface 1120 in FIG. 11C) and/or via machine readable instructions, controller 1102 generates control signals as described above in accordance with at least some of the examples of the present disclosure. In some examples, controller 1102 is embodied in a general purpose computing device while in some examples, controller 1102 is incorporated into or associated with at least some of the image formation devices, portions or elements along the travel path, fluid ejection devices, charge sources, radiation elements, drying elements, liquid removal elements, carriages, user interfaces, instructions, engines, functions, and/or methods, etc. as described throughout examples of the present disclosure.

For purposes of this application, in reference to the controller 1102, the term "processor" shall mean a presently developed or future developed processor (or processing resources) that executes machine readable instructions contained in a memory or that includes circuitry to perform computations. In some examples, execution of the machine readable instructions, such as those provided via memory 1110 of control portion 1100 cause the processor to perform the above-identified actions, such as operating controller 1102 to implement the formation of an image as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium), as represented by memory 1110. The machine readable instructions may include a sequence of instructions, a processor-executable machine learning model, or the like. In some examples, memory 1110 comprises a computer readable tangible medium providing non-volatile storage of the machine readable instructions executable by a process of controller 1102. In some examples, the computer readable tangible medium may sometimes be referred to as, and/or comprise at least a portion of, a computer program product. In other examples, hard wired circuitry may be used in place of or in combination with machine readable instructions to implement the functions described. For example, controller 1102 may be embodied as part of at least one application-specific integrated circuit (ASIC), at least one field-programmable gate array (FPGA), and/or the like. In at least some examples, the controller 1102 is not limited to any specific combination of hardware circuitry and machine readable instructions, nor limited to any particular source for the machine readable instructions executed by the controller 1102.

In some examples, control portion 1100 may be entirely implemented within or by a stand-alone device.

In some examples, the control portion 1100 may be partially implemented in one of the image formation devices and partially implemented in a computing resource separate from, and independent of, the image formation devices but in communication with the image formation devices. For instance, in some examples control portion 1100 may be implemented via a server accessible via the cloud and/or other network pathways. In some examples, the control portion 1100 may be distributed or apportioned among multiple devices or resources such as among a server, an image formation device, and/or a user interface.

Figure 11C:
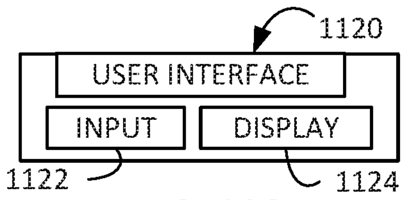
FIG. 11C is a block diagram schematically representing an example user interface.

In some examples, control portion 1100 includes, and/or is in communication with, a user interface 1120 as shown in FIG. 11C. In some examples, user interface 1120 comprises a user interface or other display that provides for the simultaneous display, activation, and/or operation of at least some of the image formation devices, portions thereof, elements, user interfaces, instructions, engines, functions, and/or methods, etc. as described in association with FIGS. 1-11B and 12. In some examples, at least some portions or aspects of the user interface 1120 are provided via a graphical user interface (GUI), and may comprise a display 1124 and input 1122.

Figure 12:
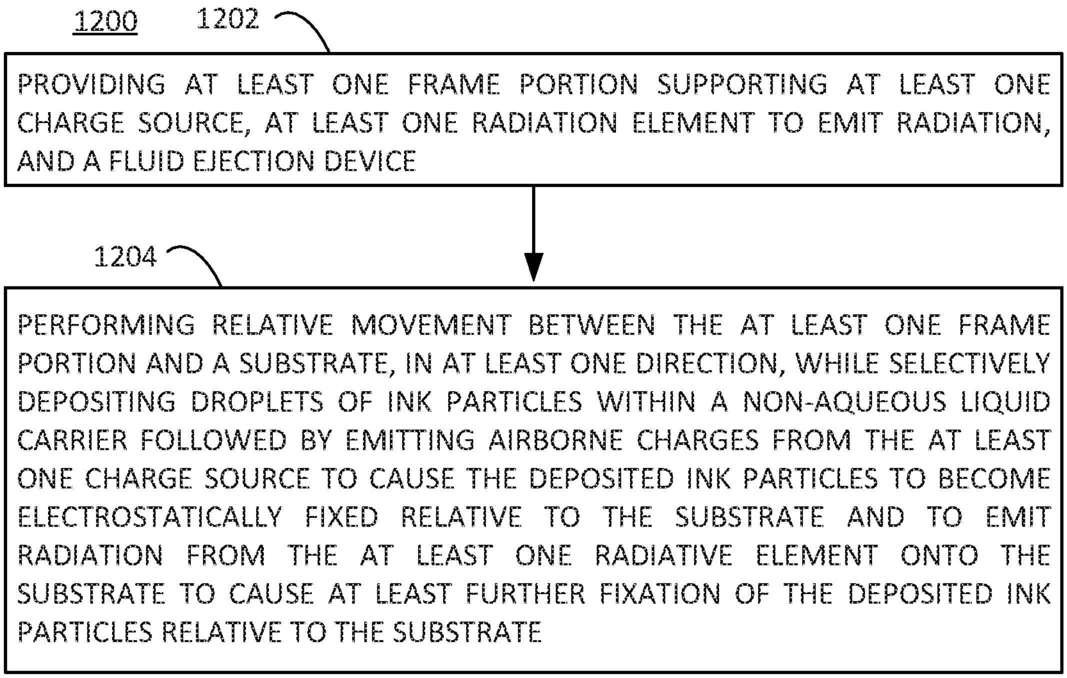
FIG. 12 is a flow diagram schematically representing an example method of image formation.

FIG. 12 is a flow diagram schematically representing an example method 1200. In some examples, method 1200 may be performed via at least some of the same or substantially the same image formation devices, portions, fluid ejection devices, charge sources, radiation elements, drying elements, liquid removal elements, elements, control portion, user interface, etc. as previously described in association with FIGS. 1-11C. In some examples, method 1200 may be performed via at least some of the same or substantially the same image formation devices, portions, fluid ejection devices, charge sources, radiation elements, drying elements, liquid removal elements, elements, control portion, user interface, etc. other than those previously described in association with FIGS. 1-11C.

As shown at 1202 in FIG. 12, method 1200 may comprise providing at least one frame portion supporting at least one charge source, at least one radiation element to emit radiation, and a fluid ejection device. As shown at 1204, method 1200 may comprise performing relative movement between the at least one frame portion and a substrate, in at least one direction, while selectively depositing droplets of ink particles within a non-aqueous liquid carrier. Airborne charges are emitted from the at least one charge source to cause the deposited ink particles to become electrostatically fixed relative to the substrate and radiation is emitted from the at least one radiative element onto the substrate to cause at least further fixation of the deposited ink particles relative to the substrate.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. An image formation device comprising:

at least one frame portion:

a fluid ejection device supported by the frame portion and configured to deposit droplets of ink particles and resin within a non-aqueous fluid carrier onto a substrate to at least partially form an image on the substrate;

at least one emitter supported by the at least one frame portion and configured to, upon relative movement between the frame portion and the substrate, emit airborne charges to fixate the ink particles onto the substrate by causing the ink particles to move, via attraction relative to the substrate, through the fluid carrier toward the substrate to electrostatically fix the ink particles relative to the substrate; and at least one radiation source supported by the at least one frame portion and configured to emit radiation to further fixate the ink particles onto the substrate by polymerizing the resin to chemically fix the ink particles relative to the substrate.

2. The image formation device of claim 1, wherein the at least one frame portion comprises a scanning carriage, wherein the at least one emitter comprises a first and a second emitter, with the fluid ejection device interposed between respective first and second emitters, and wherein upon the scanning carriage moving in a first pass a the first direction, the first emitter emits the airborne charges to electrostatically fix the deposited particles relative to the substrate, and wherein upon the scanning carriage moving in a second pass in a second direction opposite to the first direction, the second emitter emits the airborne charges to electrostatically fix the deposited particles relative to the substrate.

3. The image formation device of claim 2, wherein the at least one radiation source comprises a first radiation source and a second radiation source, with the first radiation source interposed the first emitter and a first end of the scanning carriage and with the second radiation source interposed the second emitter and an opposite second end of the scanning carriage, wherein upon the scanning carriage moving in the first pass in the first direction, the first radiation source is to emit radiation to cause at least one of further fixing the deposited particles relative to the substrate or at least partial removal of the fluid carrier from the substrate, and wherein upon the scanning carriage moving in the second pass in the opposite second direction, the second radiation source is to emit radiation to cause at least one of further fixing the deposited particles relative to the substrate or at least partial removal of the fluid carrier from the substrate.

4. The image formation device of claim 3, further comprising:

a third radiation source vertically spaced apart from, and extending across a width of, the substrate, wherein the third radiation source is in a fixed position relative to a substrate advance direction, wherein the third radiation source is downstream, in the substrate advance direction, from the carriage, and wherein the third radiation source is to at least one of:

further fix the ink particles relative to the substrate;

polymerize the resin.

5. The image formation device of claim 1, further comprising a drying element positioned to operate after the at least one radiation source to cause at least partial evaporation of at least the fluid carrier from the substrate.

6. The image formation device of claim 1, wherein the at least one radiation source comprises at least one of:

an ultraviolet light radiation source;

a visible light radiation source; and an infrared light radiation source.

7. The image formation device of claim 1, wherein at least one of:

the fluid ejection device is to deposit the droplets with the resin dissolved within the fluid carrier, the deposited droplets having an electrical conductivity less than 200 picoSiemens/cm;

the fluid ejection device is to deposit the droplets with the resin dispersed within the fluid carrier to encapsulate each respective ink particle, the emitter to emit the airborne charges to electrostatically fix the resin-encapsulated ink particles relative to the substrate; and the fluid ejection device is to deposit the droplets with the resin dispersed as resin particles within the fluid carrier, the emitter is to emit the airborne charges to electrostatically fix at least some of the resin particles relative to the substrate.

8. An image formation device comprising:

a conveyance element to move a substrate along a travel path;

a fluid ejection device configured to deposit droplets of ink particles and resin within a dielectric, non-aqueous fluid carrier onto the substrate to form at least a portion of an image on the substrate;

at least one charge source configured to emit airborne charges to fixate the ink particles onto the substrate by causing the ink particles to move, via attraction relative to the substrate, through the fluid carrier toward the substrate to electrostatically fix the ink particles relative to the substrate;

at least one radiation source configured to further fixate the ink particles onto the substrate by at least partially polymerizing the resin to chemically fix the ink particles relative to the substrate.

9. The image formation device of claim 8, further comprising:

a scanning carriage supporting the fluid ejection device, the at least one charge source and the at least one radiation source, wherein the scanning carriage is to move in a back-and-forth motion across the substrate in an orientation transverse to the travel path.

10. The image formation device of claim 9, wherein the at least one charge source comprises a first charge source and a second charge source, with the fluid ejection device interposed between the respective first and second charge sources, and wherein upon the scanning carriage moving in a first pass in a first direction, the first charge source emits the airborne charges to electrostatically fix the deposited particles relative to the substrate, and wherein upon the scanning carriage moving in a second pass in a second direction opposite to the first direction, the second charge source emits the airborne charges to electrostatically fix the deposited particles relative to the substrate.

11. The image formation device of claim 10, wherein the at least one radiation source comprises a first radiation source and a second radiation source, with the first radiation source interposed the first charge source and a first end of the scanning carriage and with the second radiation source interposed the second charge source and an opposite second end of the scanning carriage, wherein upon the scanning carriage moving in the first pass in the first direction, the first radiation source is to emit radiation to further fix the deposited ink particles relative to the substrate or to at least partially remove the fluid carrier, and wherein upon the scanning carriage moving in the second pass in the opposite second direction, the second radiation source is to emit radiation to further fix the deposited ink particles relative to the substrate or to at least partially remove the fluid carrier.

12. A method of image formation comprising:

providing at least one frame portion supporting at least one charge source, at least one radiation source to emit radiation, and a fluid ejection device;

performing relative movement between the at least one frame portion and a substrate;

while performing the relative movement, depositing droplets of ink particles and resin within a non-aqueous fluid carrier from the fluid ejection device onto the substrate to at least partially form an image on the substrate;

while performing the relative movement, and after the droplets have been deposited, emitting airborne charges from the at least one charge source to fixate the ink particles onto the substrate by causing the ink particles to move, via attraction relative to the substrate through the fluid carrier toward the substrate to electrostatically fix the ink particles relative to the substrate; and while performing the relative movement, and after emitting the airborne charges, emitting radiation from the at least one radiation source to further fixate the ink particles onto the substrate by polymerizing the resin to chemically fix the ink particles relative to the substrate.

13. The method of claim 12, further comprising:

arranging the at least one frame portion to include a scanning carriage; and arranging the at least one charge source to include a first charge source and a second charge source with the fluid ejection device interposed between respective first and second charge sources, wherein upon moving of the carriage in a first pass in a first direction, the first charge source emits the airborne charges to electrostatically fix the deposited particles relative to the substrate, and wherein upon moving of the carriage in a second pass in a second direction opposite to the first direction, the second charge source emits the airborne charges to electrostatically fix the deposited particles relative to the substrate.

14. The method of claim 13, wherein the at least one radiation source comprises a first radiation source and a second radiation source, with the first radiation source interposed between the first charge source and a first end of the carriage and with the second radiation source interposed between the second charge source and an opposite second end of the carriage, wherein upon the carriage moving in the first pass in the first direction, the first radiation source is to emit radiation to further fixate the deposited particles relative to the substrate or to at least partially remove the fluid carrier, and wherein upon the carriage moving in the second pass in the opposite second direction, the second radiation source is to emit radiation to further fixate the deposited particles relative to the substrate or to at least partially remove the fluid carrier.

15. The method of claim 12, wherein at least one of:

the resin is dissolved within the fluid carrier and the deposited droplets have an electrical conductivity less than 200 picoSiemens/cm, and the resin is dispersed within the fluid carrier to encapsulate each respective ink particle, and the charge source is to emit the charges to electrostatically fix the resin-encapsulated ink particles relative to the substrate.

* * * * *